US011178171B2

(12) United States Patent
Hsiung et al.

(10) Patent No.: US 11,178,171 B2
(45) Date of Patent: Nov. 16, 2021

(54) SECURITY MECHANISM FOR SUSPICIOUS FILES

(71) Applicant: International Business Machines Corporation, Armonk, NY (US)

(72) Inventors: Wei-Hsiang Hsiung, Taipei (TW); Ming Hsun Wu, New Taipei (TW); Wei-Shiau Suen, Taichung (TW); Cheng-ta Lee, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 16/209,421

(22) Filed: Dec. 4, 2018

(65) Prior Publication Data
US 2020/0177605 A1    Jun. 4, 2020

(51) Int. Cl.
*H04L 29/06*    (2006.01)
*G06F 21/62*    (2013.01)
*H04L 9/06*    (2006.01)
*H04L 9/08*    (2006.01)

(52) U.S. Cl.
CPC ........ *H04L 63/145* (2013.01); *G06F 21/6209* (2013.01); *H04L 9/065* (2013.01); *H04L 9/0819* (2013.01); *H04L 63/02* (2013.01); *H04L 9/0894* (2013.01); *H04L 63/0281* (2013.01)

(58) Field of Classification Search
CPC .................................................... H04L 63/145
See application file for complete search history.

(56) References Cited

U.S. PATENT DOCUMENTS

| 6,023,709 | A | 2/2000 | Anglin et al. |
| 7,209,892 | B1 * | 4/2007 | Galuten .................. G06F 21/10 705/26.62 |
| 7,908,653 | B2 | 3/2011 | Brickell et al. |
| 8,793,787 | B2 | 7/2014 | Ismael et al. |
| 2002/0143792 | A1 | 10/2002 | Belu |
| 2004/0030643 | A1 * | 2/2004 | Madison ............... H04L 63/104 705/39 |

(Continued)

FOREIGN PATENT DOCUMENTS

WO    2018004572 A1    4/2018

OTHER PUBLICATIONS

Li, et al. "AOS: An Optimized Sandbox Method Used in Behavior-Based Malware Detection," 2011 International Conference on Machine Learning and Cybernetics, Jul. 10-13, 2011.

(Continued)

*Primary Examiner* — Simon P Kanaan
(74) *Attorney, Agent, or Firm* — Troutman Pepper Hamilton Sanders LLP

(57) ABSTRACT

Embodiments are directed to a method of monitoring a suspicious file, including: receiving, from a web server, a first file; encrypting, by an intermediary network device, the first file; transferring the encrypted file, from the intermediary network device, to an end device; transferring the first file, from the intermediary network device, to a malware analysis device for a malware analysis; and receiving a malware analysis result, from the malware analysis device. If the malware analysis result indicates the first file is not a malware, requesting a key; decrypting the encrypted file using the key; and accessing the decrypted file.

20 Claims, 5 Drawing Sheets

(56) References Cited

U.S. PATENT DOCUMENTS

2012/0136972 A1* 5/2012 Hata ................. G06F 21/10
709/219
2016/0323295 A1* 11/2016 Joram ................ G06F 21/566
2017/0344740 A1* 11/2017 Langton ............. G06F 21/53

OTHER PUBLICATIONS

Ortiz, "Deployment of a Flexible Malware Sandbox Environment Using Open Source Software," SANS Institute, 2015.

* cited by examiner

SECURITY MECHANISM FOR SUSPICIOUS FILES

TECHNICAL FIELD

The present disclosure relates generally to a system, method and computer program product which are used to protect users from attacks by malicious files.

BACKGROUND

With the advance of virtualization and sandbox technologies, more network devices utilize such technologies to run suspicious executable files in a controlled environment, to check whether the suspicious executable files are malicious. This process generally needs a plurality of minutes, which hinders a user's experience.

Specifically, if there is a suspicious file in queue (e.g., a user is downloading a file), an intermediary network device (also called inspector) can run the suspicious file in a sandbox (also called working directory, test server or development server). The intermediary network device can block the suspicious file until completion of malware analysis, notify users of a malware analysis result later without blocking the suspicious file, or keep the suspicious file on the intermediary network device and send the file to users if the malware analysis result indicates the suspicious file is clean. The first approach requires a high memory footprint on the intermediary network device, because a connection to the suspicious file needs to be maintained until completion of malware analysis. The second approach puts users at risk because the users can access this suspicious file which may be malicious. The third approach requires a large local storage space in the intermediary network device.

Further, if the malware analysis function is performed by an agent (i.e., program) residing in an end device, then the malware analysis function can be bypassed by disabling the agent. Additionally, it is difficult to enforce agent installation on every end device.

SUMMARY

Embodiments provide a method of monitoring a suspicious file, comprising: receiving, by an intermediary network device, a first file from a web server; encrypting, by an intermediary network device, the first file; transferring the encrypted file, from the intermediary network device, to an end device; transferring the first file, from the intermediary network device, to a malware analysis device for a malware analysis; and receiving, by the intermediary network device or the end device, a malware analysis result, from the malware analysis device. If the malware analysis result indicates that the first file is not a malware, requesting, by the end device, a key from the intermediary network device or the malware analysis device; decrypting, by the end device, the encrypted file using the key; and accessing, by the end device, the decrypted file.

Embodiments further provide a method of monitoring a suspicious file, wherein the key is stored at the intermediary network device.

Embodiments further provide a method of monitoring a suspicious file, wherein the key is stored at the malware analysis device.

Embodiments further provide a method of monitoring a suspicious file, wherein the intermediary network device comprises one of a network gateway, a proxy server, a firewall, and an intrusion prevention system.

Embodiments further provide a method of monitoring a suspicious file, wherein the step of encrypting comprises encrypting the first file using a stream cipher.

Embodiments further provide a method of monitoring a suspicious file, further comprising: transferring a file header to the end device, wherein the file header and the encrypted file are combined to form a pre-programmed file.

Embodiments further provide a method of monitoring a suspicious file, wherein the first file includes a plurality of file portions, wherein the step of receiving, from a web server, a first file comprises receiving the plurality of file portions sequentially, and the step of encrypting comprises encrypting the plurality of file portions sequentially.

Embodiments provide a system for monitoring a suspicious file, the system comprising: an intermediary network device, comprising a processor configured to: receive, from a web server, a first file; obfuscate, by an intermediary network device, the first file; transfer the obfuscated file, from the intermediary network device, to an end device; transfer the first file, from the intermediary network device, to a malware analysis device for a malware analysis; and receive, by the intermediary network device or the end device, a malware analysis result, from the malware analysis device. If the malware analysis result indicates that the first file is not a malware, request, by the end device, a key from the intermediary network device or the malware analysis device; de-obfuscate, by the end device, the obfuscated file using the key; and access, by the end device, the de-obfuscated file.

Embodiments further provide a system for monitoring a suspicious file, wherein the key is stored at the intermediary network device.

Embodiments further provide a system for monitoring a suspicious file, wherein the key is stored at the malware analysis device.

Embodiments further provide a system for monitoring a suspicious file, wherein the intermediary network device comprises one of a network gateway, a proxy server, a firewall, and an intrusion prevention system.

Embodiments further provide a system for monitoring a suspicious file, wherein the processor is further configured to: transfer a file header to the end device, wherein the file header and the obfuscated file are combined to form a pre-programmed file.

Embodiments further provide a system for monitoring a suspicious file, wherein the first file includes a plurality of file portions, wherein the processor is configured to: receive the plurality of file portions sequentially, and de-obfuscate the plurality of file portions sequentially.

Embodiments further provide a system for monitoring a suspicious file, wherein the processor is further configured to: if the malware analysis result indicates the first file is a malware, delete the obfuscated file.

Embodiments provide a computer program product for monitoring a suspicious file, the computer program product comprising a computer readable storage medium having program instructions embodied therewith, the program instructions executable by a processor to cause the processor to receive, from a web server, a first file; encrypt, by an intermediary network device, the first file; transfer the encrypted file, from the intermediary network device, to an end device; transfer the first file, from the intermediary network device, to a malware analysis device for a malware analysis; and receive a malware analysis result, from the malware analysis device. If the malware analysis result indicates the first file is not a malware, request, by the end device, a key; decrypt, by the end device, the encrypted file using the key; and access, by the end device, the decrypted file.

Embodiments further provide a computer program product for monitoring a suspicious file, wherein the key is stored at the intermediary network device.

Embodiments further provide a computer program product for monitoring a suspicious file, wherein the key is stored at the malware analysis device.

Embodiments further provide a computer program product for monitoring a suspicious file, wherein the intermediary network device comprises one of a network gateway, a proxy server, a firewall, and an intrusion prevention system.

Embodiments further provide a computer program product for monitoring a suspicious file, wherein the program instructions further cause the processor to: transfer a file header to the end device, wherein the file header and the encrypted file are combined to form a pre-programmed file.

Embodiments further provide a computer program product for monitoring a suspicious file, wherein the program instructions further cause the processor to receive the plurality of file portions sequentially, and encrypt the plurality of file portions sequentially.

Additional features and advantages are apparent from the following detailed description that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
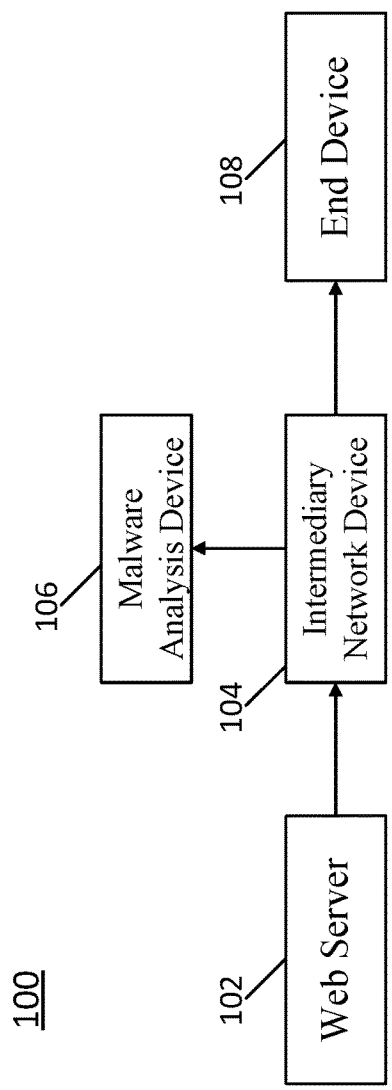
FIG. 1 is a diagram depicting an architecture 100 of security mechanism for suspicious files, according to embodiments provided herein.

The present invention may be a system, a method, and/or a computer program product. The computer program product may include a computer readable storage medium (or media) having computer readable program instructions thereon for causing a processor to carry out aspects of the present invention.

According to embodiments disclosed herein, an intermediary network device is provided in the present disclosure. In an embodiment, the intermediary network device, such as a network gateway, a proxy server, a firewall, an intrusion prevention system (IPS), etc., replaces file content after a file (e.g., suspicious file) is intercepted by the intermediary network device. Due to replacement of the file content, users cannot access the original file directly so that they are immune to the original file while a malware analysis performed by a remote malware analysis device is still in progress. The new file (an executable file) with the replaced file content will be notified when the malware analysis is completed. In terms of the analysis result, the original file can be provided to users if the original file is not a malware, or blocked if it is diagnosed as a malware.

In an embodiment, the replaced file is stored at an end device of one or more users. The end device can be, for example, a computer (work station, laptop, file server, or web server), network printer, VoIP phone, TelePresence endpoint, security camera, mobile handheld device (such as a smartphone, tablet, PDA, wireless debit/credit card reader or barcode scanner), etc. In an embodiment, the intermediary network device (i.e., inspector) can encrypt the file content using stream ciphers or obfuscate the file content, so that when a user receives the file, the original file content is preserved but encrypted or encoded (i.e., obfuscated). Hence, the intermediary network device doesn't need to cache the original file, while the encrypted or obfuscated file is directly stored at the end device. Accordingly, the memory footprint of the intermediary network device is greatly reduced, and/or a large local storage space of the intermediary network device is not required. Moreover, this approach can also reduce the bandwidth consumption when the user accesses the file if the analysis malware result indicates that the original file is clean, because the encrypted file is stored directly at the end device of the user. Only a key is required to decrypt or de-obfuscate the encrypted or obfuscated file, and no file transfer is needed again.

In an embodiment, a pre-programmed file is used to replace the original file. The pre-programmed file has the following features: (1) indicating the progress of malware analysis; (2) notifying completion of the malware analysis; (3) showing the result of the malware analysis; (4) retrieving a key to decrypt the file content data; and (5) replacing the pre-programmed file itself with the original file if the original file is clean, or deleting the pre-programmed file itself if the original file is malicious, based on the malware analysis result. The pre-programmed file includes a special file header, and encrypted file content. The file header indicates that the pre-programmed file is an executable file instead of a regular file. The format of the pre-programmed file varies on the operating system of the intermediary network device. For example, the pre-programmed file is an ".exe" file for the Windows operating system, while it is an ".elf" file for the Linux operating system. When a user tries to open the pre-programmed file, a plurality of steps are performed. Specifically, the pre-programmed file interacts with a remote malware analysis device, and retrieves the status or result of malware analysis. A dialog box may be presented at the end device of the user to show the status of the original file "waiting for inspection," "inspecting," "found malware," or "clean file." The dialog box is then automatically closed, and the original file is retrieved if the original file is clean.

In an embodiment, the intermediary network device can intercept the original file, and then obfuscate or encrypt the file content of the original file. The data obfuscation can be done in different ways. For example, the original file data blocks can be shuffled. In an example, data block 14→data block 24→data block 3 is shuffled and changed to data block 3→data block 1→data block 2. In another embodiment, the file content of the original file is encrypted using a stream cipher. The stream cipher is a symmetric key cipher where plaintext digits are combined with a pseudorandom cipher digit stream (keystream). In a stream cipher, each plaintext digit is encrypted one at a time with the corresponding digit of the keystream, to give a digit of the ciphertext stream. A digit is typically a bit and the combining operation an exclusive-or (XOR). In another embodiment, the file content is encrypted using a codebook. The codebook is a document used for implementing a code. The codebook includes a lookup table for coding and decoding, and each word or phrase has one or more strings which replace it.

Meanwhile, after the intermediary network device intercepts the whole original file, the intermediary network device submits the whole original file to the remote malware analysis device for malware analysis. Before the malware analysis is completed, the user can only access the pre-programmed file including the obfuscated or encrypted file content.

In an embodiment, the pre-programmed file keeps waiting for malware analysis completion signaled either by the intermediary network device or the malware analysis device. Once the malware analysis is done and the analysis result is positive (i.e., the original file is a clean file), the intermediary network device or the malware analysis device signals the pre-programmed file with a key. In another embodiment, the pre-programmed file actively polls the status of the malware analysis, and requests the key either from the intermediary network device or from the malware analysis device once the malware analysis is done. The key enables accessibility of the user to the original file content. Specifically, the data portion of the pre-programmed file is de-obfuscated or decrypted using the key, and the user can access the de-obfuscated or decrypted file content (i.e., the original file content). Specifically, the data portion of the pre-programmed file is de-obfuscated or decrypted to form a temporary file, which is then renamed as the original file name. The pre-programmed file is accordingly deleted.

In an embodiment, a sandboxing solution is hosted in a cloud to provide a malware analysis service. The key is stored on the malware analysis device hosted in a cloud. In this embodiment, the original file and the pre-programmed file are entirely separate from the intermediary network device once the file transmission is completed. Specifically, the original file is sent through the intermediary network device to the malware analysis device for malware analysis, while the pre-programmed file is sent through the intermediary network device to the end device. If the key is stored on the malware analysis device, the pre-programmed file can query the malware analysis device, instead of the intermediary network device, to obtain a key for de-obfuscating or decrypting the obfuscated or encrypted file content of the pre-programmed file. In another embodiment, the key is stored at the intermediary network device, and the pre-programmed file can query the intermediary network device, to obtain a key for de-obfuscating or decrypting the obfuscated or encrypted file content of the pre-programmed file if the original file is clean.

FIG. 1 is a diagram depicting an architecture 100 of security mechanism for suspicious files, according to embodiments provided herein. As shown in FIG. 1, if a user chooses to download a file from the web server 102, an original file is transferred from the web server 102 and intercepted by the intermediary network device 104, and the original file is then transformed to a pre-programmed file by the intermediary network device 104. The pre-programmed file is then sent from the intermediary network device 104 to the end device 108. The original file is sent from the intermediary network device 104 to the malware analysis device 106 device for malware analysis. If the analysis result indicates that the original file is not a malware, the pre-programmed file is then de-obfuscated or decrypted using a key. On the contrary, if the analysis result indicates that the original file is a malware, the user can ignore or delete the pre-programmed file. The key can be stored at the malware analysis device 106 or the intermediary network device 104.

Figure 2:
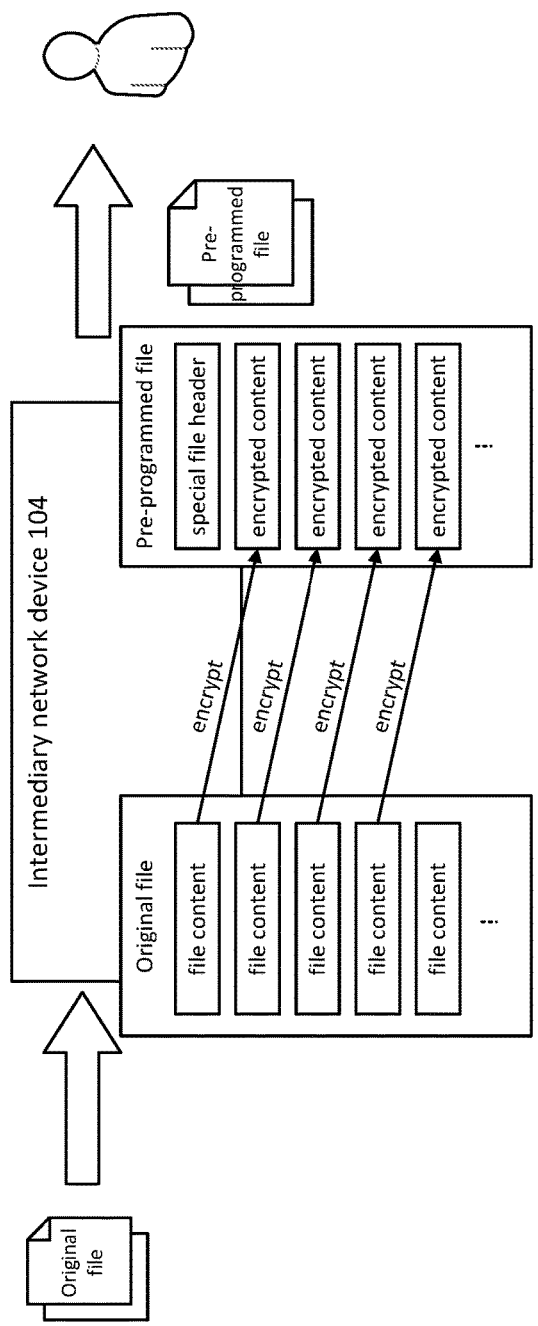
FIG. 2 is a diagram depicting a mechanism of generating a pre-programmed file, according to embodiments provided herein.

FIG. 2 is a diagram depicting a mechanism of generating the pre-programmed file, according to embodiments provided herein. As shown in FIG. 2, while the original file is being transferred to the intermediary network device 104, the file content of the original file is also being encrypted by the intermediary network device 104. In an embodiment, the intermediary network device 104 can use streaming ciphers to encrypt the file content. When an user of the end device 108 receives the pre-programmed file, the original file content is preserved but encrypted.

Figure 3:
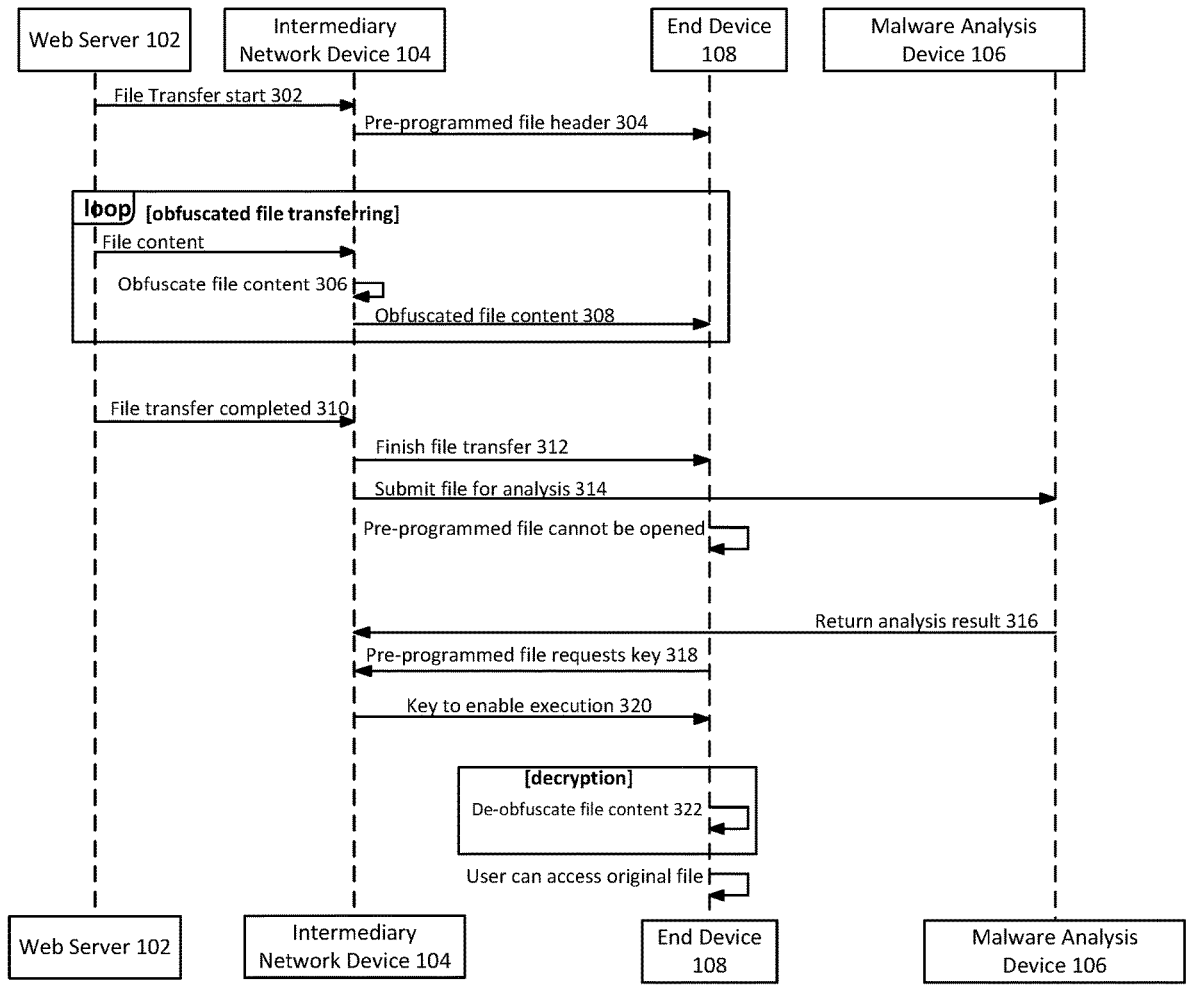
FIG. 3 is a diagram depicting a flow chart of security mechanism for suspicious files, according to an embodiment provided herein.

FIG. 3 is a diagram depicting a flow chart of security mechanism for suspicious files, according to an embodiment provided herein. As shown in FIG. 3, at step 302, the original file starts to be transferred from the web server 102 to the intermediary network device 104. At step 304, a pre-programmed file header is transferred from the intermediary network device 104 to the end device 108. At step 306, upon receiving a first portion of file content of the original file, the intermediary network device 104 obfuscates the first portion of file content of the original file. At step 308, the obfuscated first portion of file content of the original file is sent from the intermediary network device 104 to the end device 108. Similarly, upon receiving a second portion of file content of the original file, the intermediary network device 104 obfuscates the second portion of file content of the original file, and sends the obfuscated second portion of file content of the original file to the end device 108. The steps 306 and 308 are repeated until the intermediary network device 104 obfuscates the whole file content of the original file, and sends the whole obfuscated file content of the original file to the end device 108. In other words, the steps 306 and 308 are repeated until both the file transfer (in step 310) from the web server 102 to the intermediary network device 104 and the file transfer (in step 312) from the intermediary network device 104 to the end device 108 are completed. The pre-programmed file header, the obfuscated first portion of file content, the obfuscated second portion of file content, the obfuscated third portion of file content, . . . , are sequentially combined together to form a pre-programmed file. At step 314, the whole original file is sent from the intermediary network device 104 to the malware analysis device 106 for malware analysis. During the malware analysis, the pre-programmed file cannot be opened by the user, because the file content in the pre-programmed file is obfuscated. At step 316, after the malware analysis is finished, the analysis result is returned from the malware analysis device 106 to the intermediary network device 104. At step 318, the pre-programmed file at the end device 108 requests a key from the intermediary network device 104. In this embodiment, the key is stored at the intermediary network device 104. At step 320, the key is sent from the intermediary network device 104 to the end device 108. At step 322, the pre-programmed file is de-obfuscated using the key. After the de-obfuscation, the user can access the original file content at the end device 108.

Figure 4:
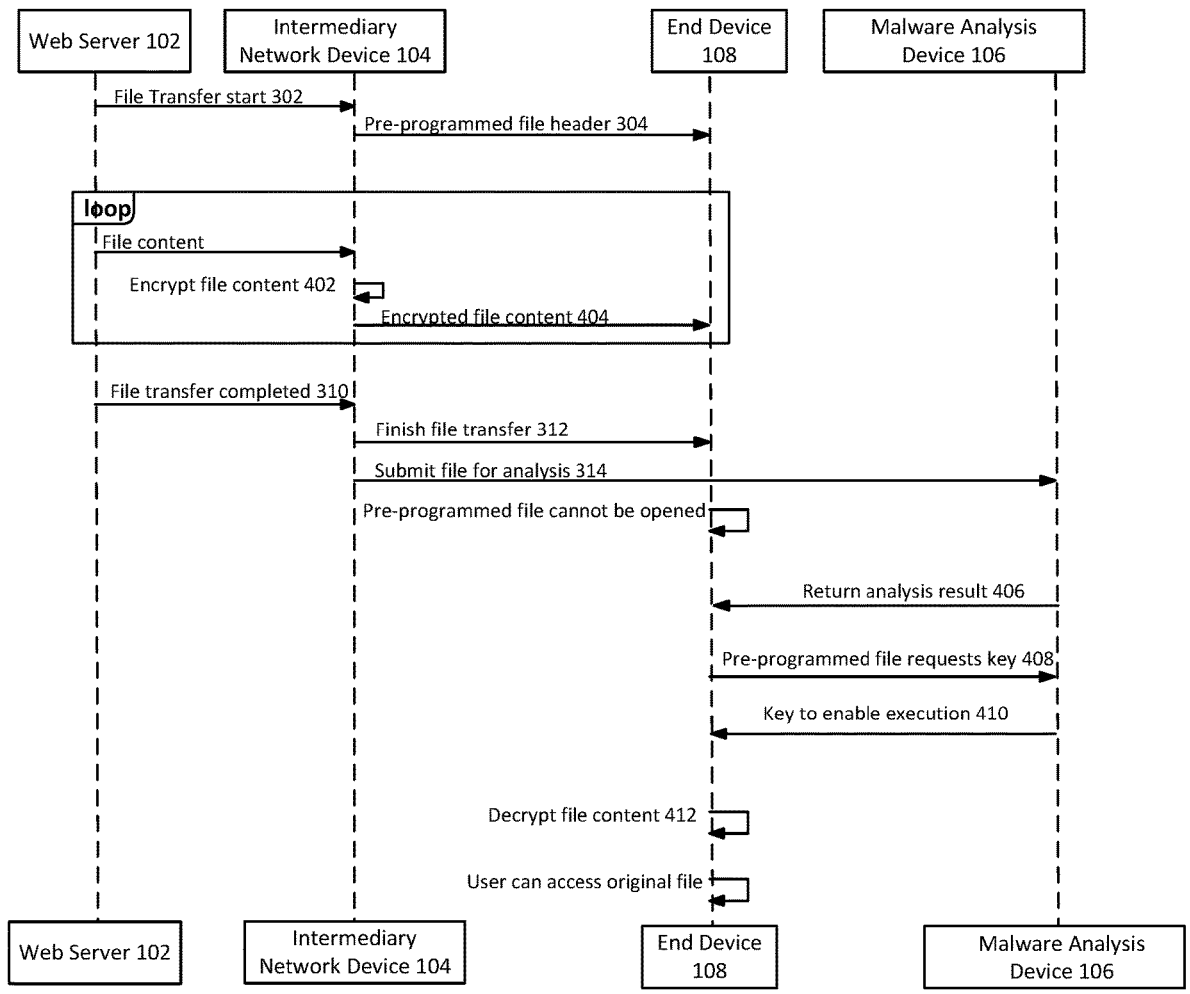
FIG. 4 is a diagram depicting a flow chart of security mechanism for suspicious files, according to another embodiment provided herein.

FIG. 4 is a diagram depicting a flow chart of security mechanism for suspicious files, according to another embodiment provided herein. As shown in FIG. 4, in this embodiment, the pre-programmed file is encrypted. At step 402, upon receiving a first portion of file content of the original file, the intermediary network device 104 encrypts the first portion of file content of the original file. At step 404, the encrypted first portion of file content of the original file is sent from the intermediary network device 104 to the end device 108. Similarly, upon receiving a second portion of file content of the original file, the intermediary network device 104 encrypts the second portion of file content of the original file, and send the encrypted second portion of file content of the original file to the end device 108. The steps 402 and 404 are repeated until the intermediary network device 104 encrypts the whole file content of the original file, and sends the whole encrypted file content of the original file to the end device 108. In other words, the steps 402 and 404 are repeated until both the file transfer (step 310) from the web server 102 to the intermediary network device 104 and the file transfer (step 312) from the intermediary network device 104 to the end device 108 are completed. The pre-programmed file header, the encrypted first portion of file content, the encrypted second portion of file content, the encrypted third portion of file content, . . . , are sequentially combined together to form a pre-programmed file. Accordingly, at step 412, the pre-programmed file is decrypted to obtain the original file content. Further, in this embodiment, the key is stored at the malware analysis device 106. At step 406, the analysis result is returned from the malware analysis device 106 to the end device 108. At step 408, the pre-programmed file at the end device 108 requests a key from the malware analysis device 106. At step 410, the key is sent from the malware analysis device 106 to the end device 108. In this embodiment, the key is stored at the malware analysis device 106, and thus after the file transfer (steps 310 and 312) is completed, the intermediary network device 104 can be decoupled from the end device 108.

Figure 5:
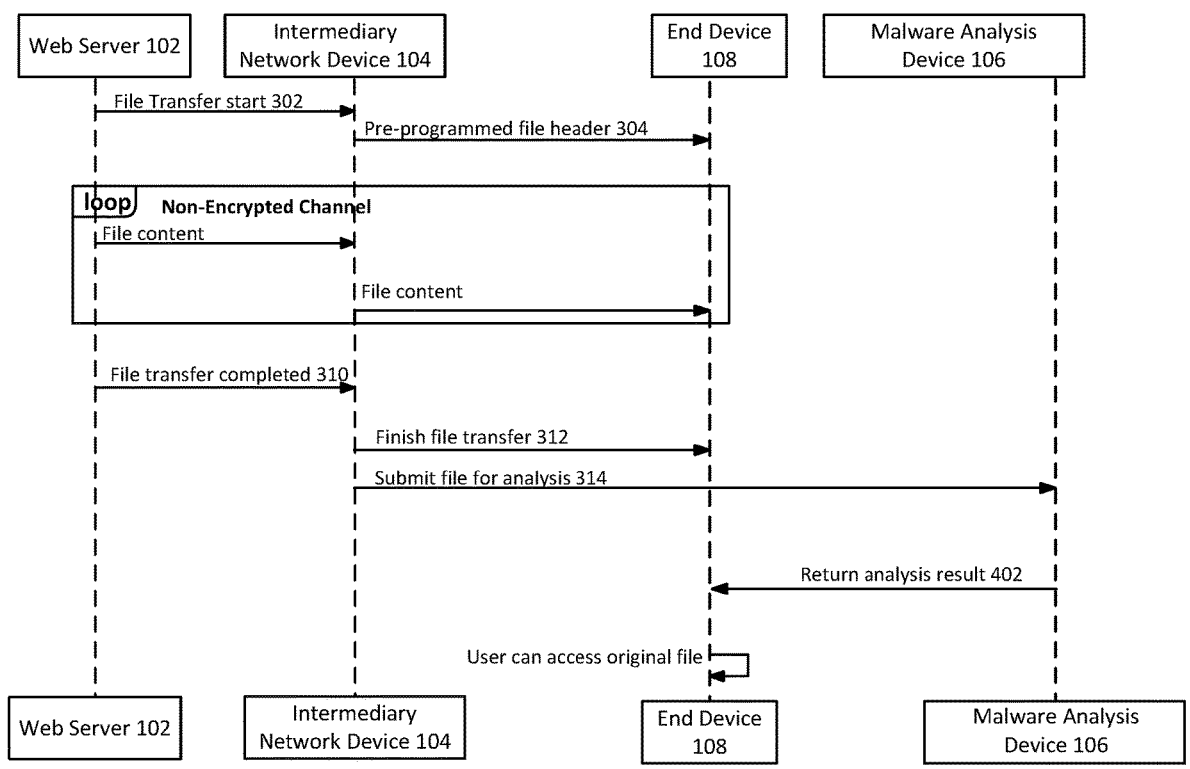
FIG. 5 is a diagram depicting a flow chart of security mechanism for suspicious files, according to further another embodiment provided herein.

FIG. 5 is a diagram depicting a flow chart of security mechanism for suspicious files, according to another embodiment provided herein. As shown in FIG. 5, in this embodiment, the original file is directly transferred from the web server 102 to the end device 108 through the intermediary network device 104 using a plain-text channel (i.e., non-encrypted channel). In this embodiment, it is easier for the intermediary network device 104 to replace the original file, because the original file is a plain-text file.

Figure 6:
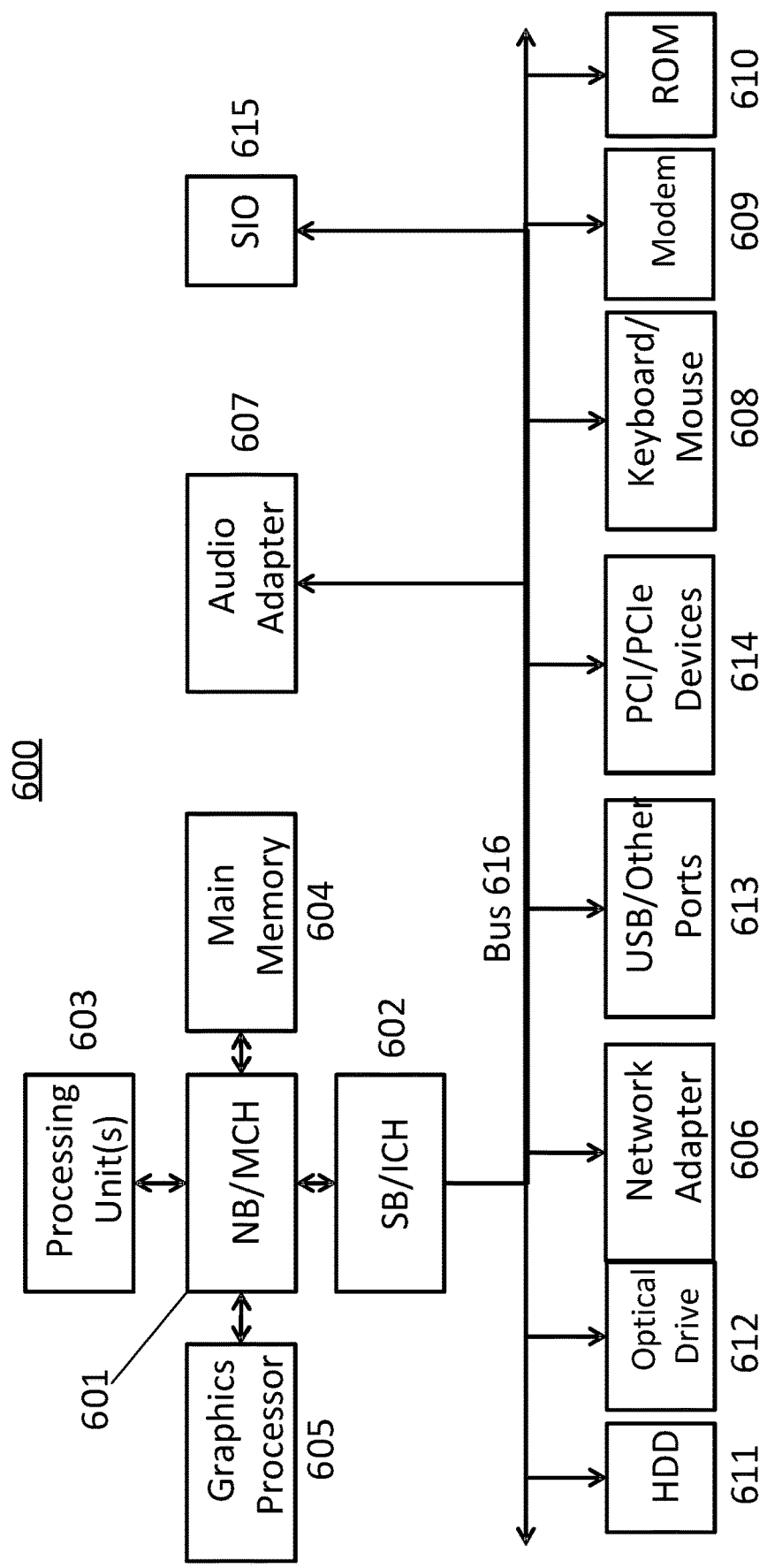
FIG. 6 is a block diagram of an example data processing system 600 in which aspects of the illustrative embodiments are implemented.

FIG. 6 is a block diagram of an example data processing system 600 in which aspects of the illustrative embodiments are implemented. In an embodiment, the web server 102, the malware analysis device 106, and/or the end device 108 can be implemented as the data processing system 600. Data processing system 600 is an example of a computer, such as a server or client, in which computer usable code or instructions implementing the process for illustrative embodiments of the present invention are located. In one embodiment, FIG. 6 may represent a server computing device.

In the depicted example, data processing system 600 can employ a hub architecture including a north bridge and memory controller hub (NB/MCH) 601 and south bridge and input/output (I/O) controller hub (SB/ICH) 602. Processing unit 603, main memory 604, and graphics processor 605 can be connected to the NB/MCH 601. Graphics processor 605 can be connected to the NB/MCH 601 through, for example, an accelerated graphics port (AGP) (not shown in FIG. 6).

In the depicted example, a network adapter 606 connects to the SB/ICH 602. An audio adapter 607, keyboard and mouse adapter 608, modem 609, read only memory (ROM) 610, hard disk drive (HDD) 611, optical drive (e.g., CD or DVD) 612, universal serial bus (USB) ports and other communication ports 613, and PCI/PCIe devices 614 may connect to the SB/ICH 602 through bus system 616. PCI/PCIe devices 614 may include Ethernet adapters, add-in cards, and PC cards for notebook computers. ROM 610 may be, for example, a flash basic input/output system (BIOS). The HDD 611 and optical drive 612 can use an integrated drive electronics (IDE) or serial advanced technology attachment (SATA) interface. A super I/O (SIO) device 615 can be connected to the SB/ICH 602.

An operating system can run on processing unit 603. The operating system can coordinate and provide control of various components within the data processing system 600. As a client, the operating system can be a commercially available operating system. An object-oriented programming system, such as the Java™ programming system, may run in conjunction with the operating system and provide calls to the operating system from the object-oriented programs or applications executing on the data processing system 600. As a server, the data processing system 600 can be an IBM® eServer™ System p® running the Advanced Interactive Executive operating system or the Linux operating system. The data processing system 600 can be a symmetric multiprocessor (SMP) system that can include a plurality of processors in the processing unit 603. Alternatively, a single processor system may be employed.

Instructions for the operating system, the object-oriented programming system, and applications or programs are located on storage devices, such as the HDD 611, and are loaded into the main memory 604 for execution by the processing unit 603. The processes for embodiments described herein can be performed by the processing unit 603 using computer usable program code, which can be located in a memory such as, for example, main memory 604, ROM 610, or in one or more peripheral devices.

A bus system 616 can be comprised of one or more busses. The bus system 616 can be implemented using any type of communication fabric or architecture that can provide for a transfer of data between different components or devices attached to the fabric or architecture. A communication unit such as the modem 609 or the network adapter 606 can include one or more devices that can be used to transmit and receive data.

Those of ordinary skill in the art will appreciate that the hardware depicted in FIG. 6 may vary depending on the implementation. Other internal hardware or peripheral devices, such as flash memory, equivalent non-volatile memory, or optical disk drives may be used in addition to or in place of the hardware depicted. Moreover, the data processing system 600 can take the form of any of a number of different data processing systems, including but not limited to, client computing devices, server computing devices, tablet computers, laptop computers, telephone or other communication devices, personal digital assistants, and the like. Essentially, data processing system 600 can be any known or later developed data processing system without architectural limitation.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A method of monitoring a suspicious file, comprising:
   receiving, by an intermediary network device, a first file from a web server;
   encrypting, by an intermediary network device, the first file;
   transferring the encrypted file, from the intermediary network device, to an end device;
   transferring the first file, from the intermediary network device, to a malware analysis device for a malware analysis; and
   receiving, by the intermediary network device or the end device, a malware analysis result, from the malware analysis device;
   if the malware analysis result indicates that the first file is not a malware,
      requesting, by the end device, a key from the intermediary network device or the malware analysis device;
      decrypting, by the end device, the encrypted file using the key; and
      accessing, by the end device, the decrypted file.

2. The method of claim 1, wherein the key is stored at the intermediary network device.

3. The method of claim 1, wherein the key is stored at the malware analysis device.

4. The method of claim 1, wherein the intermediary network device comprises one of a network gateway, a proxy server, a firewall, and an intrusion prevention system.

5. The method of claim 1, wherein the step of encrypting comprises encrypting the first file using a stream cipher.

6. The method of claim 1, further comprising: transferring a file header to the end device, wherein the file header and the encrypted file are combined to form a pre-programmed file on the end device.

7. The method of claim 6, wherein the first file includes a plurality of file portions, wherein the step of receiving, from a web server, a first file comprises receiving the plurality of file portions sequentially, and the step of encrypting comprises encrypting the plurality of file portions sequentially.

8. A system for monitoring a suspicious file, the system comprising:
   an intermediary network device, comprising a processor configured to:
      receive, from a web server, a first file;
      obfuscate, by an intermediary network device, the first file;
      transfer the obfuscated file, from the intermediary network device, to an end device;
      transfer the first file, from the intermediary network device, to a malware analysis device for a malware analysis; and
      receive, by the intermediary network device or the end device, a malware analysis result, from the malware analysis device;
      if the malware analysis result indicates that the first file is not a malware,
         request, by the end device, a key from the intermediary network device or the malware analysis device;
         de-obfuscate, by the end device, the obfuscated file using the key; and
         access, by the end device, the de-obfuscated file.

9. The system of claim 8, wherein the key is stored at the intermediary network device.

10. The system of claim 8, wherein the key is stored at the malware analysis device.

11. The system of claim 8, wherein the intermediary network device comprises one of a network gateway, a proxy server, a firewall, and an intrusion prevention system.

12. The system of claim 8, wherein the processor is further configured to:
   transfer a file header to the end device, wherein the file header and the obfuscated file are combined to form a pre-programmed file on the end device.

13. The system of claim 12, wherein the first file includes a plurality of file portions, wherein the processor is configured to:
   receive the plurality of file portions sequentially, and
   de-obfuscate the plurality of file portions sequentially.

14. The system of claim 12, wherein the processor is further configured to:
   if the malware analysis result indicates the first file is a malware,
      delete the obfuscated file.

15. A computer program product for monitoring a suspicious file, the computer program product comprising a computer readable storage medium having program instructions embodied therewith, the program instructions executable by a processor to cause the processor to
   receive, from a web server, a first file;
   encrypt, by an intermediary network device, the first file;
   transfer the encrypted file, from the intermediary network device, to an end device;
   transfer the first file, from the intermediary network device, to a malware analysis device for a malware analysis; and
   receive a malware analysis result, from the malware analysis device;
   if the malware analysis result indicates the first file is not a malware,
      request, by the end device, a key;
      decrypt, by the end device, the encrypted file using the key; and
      access, by the end device, the decrypted file.

16. The computer program product of claim 15, wherein the key is stored at the intermediary network device.

17. The computer program product of claim 15, wherein the key is stored at the malware analysis device.

18. The computer program product of claim 15, wherein the intermediary network device comprises one of a network gateway, a proxy server, a firewall, and an intrusion prevention system.

19. The computer program product of claim 15, wherein the program instructions further cause the processor to
transfer a file header to the end device, wherein the file header and the encrypted file are combined to form a pre-programmed file on the end device.

20. The computer program product of claim 19, wherein the program instructions further cause the processor to
receive the plurality of file portions sequentially, and
encrypt the plurality of file portions sequentially.

* * * * *